No. 770,672. PATENTED SEPT. 20, 1904.
J. L. BUCKINGHAM.
CULTIVATOR.
APPLICATION FILED FEB. 15, 1904.
NO MODEL. 2 SHEETS—SHEET 1.
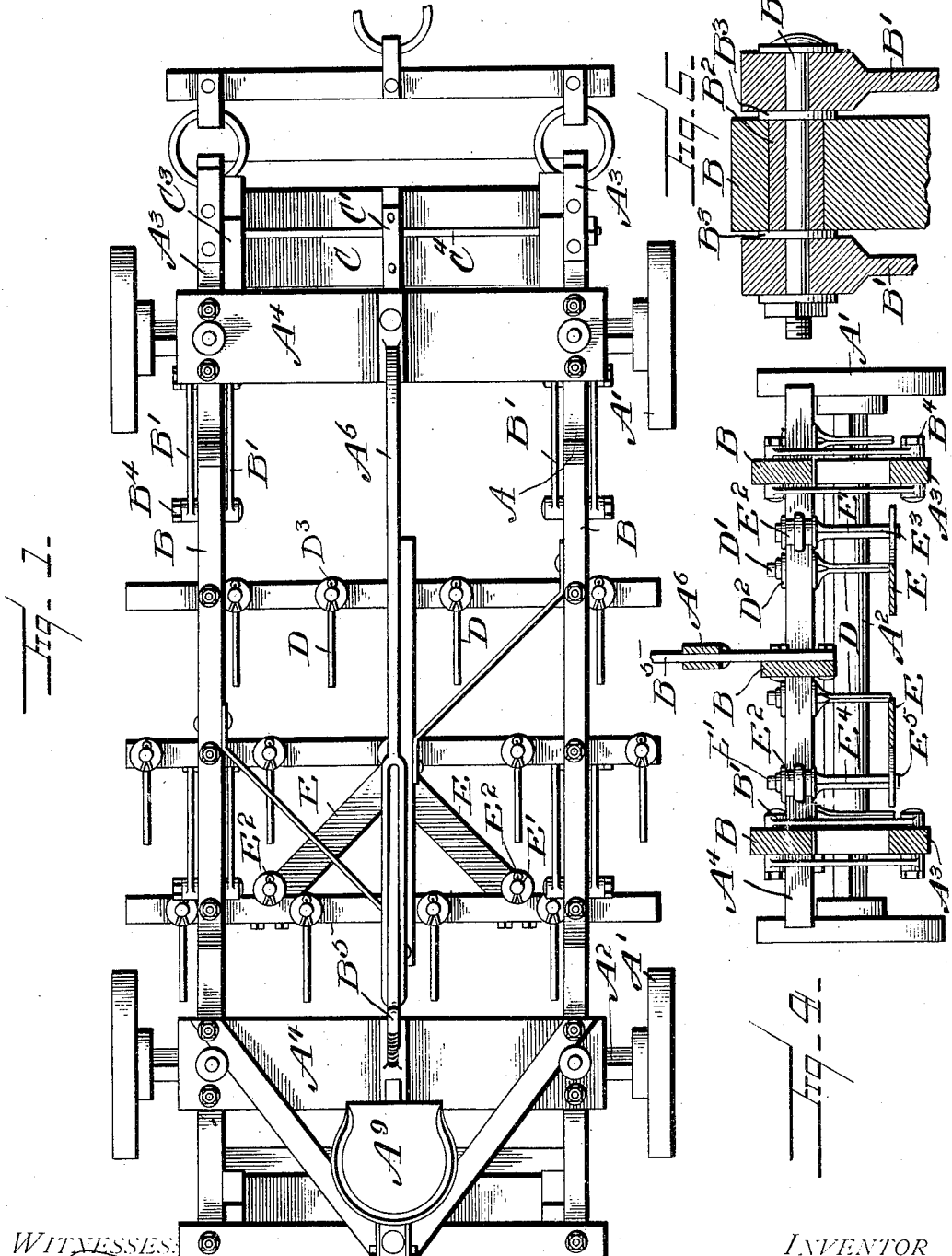
WITNESSES: INVENTOR
John L. Buckingham,
by
Attorney

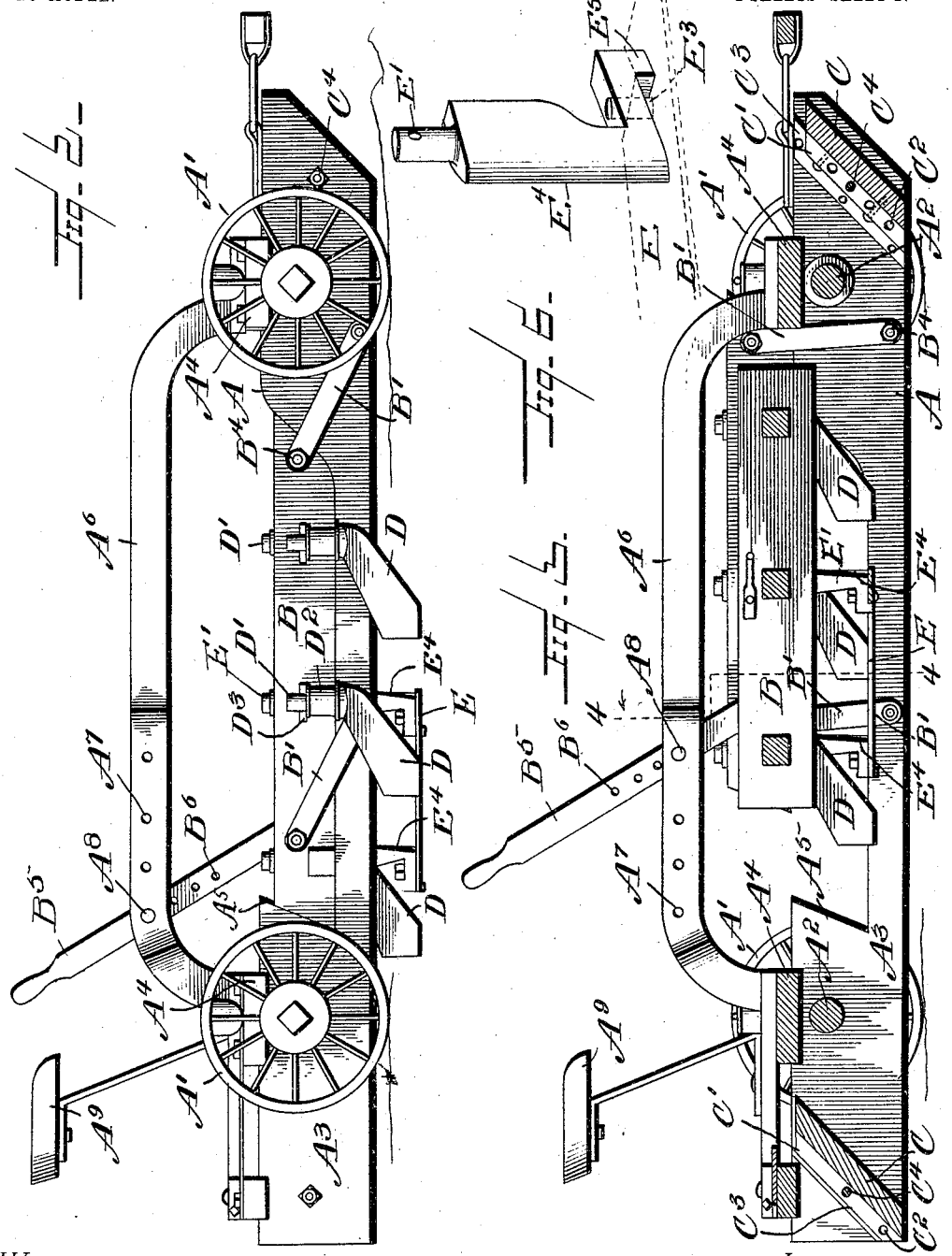

No. 770,672. Patented September 20, 1904.

UNITED STATES PATENT OFFICE.

JOHN L. BUCKINGHAM, OF LATON, CALIFORNIA.

CULTIVATOR.

SPECIFICATION forming part of Letters Patent No. 770,672, dated September 20, 1904.

Application filed February 15, 1904. Serial No. 193,649. (No model.)

*To all whom it may concern:*

Be it known that I, JOHN L. BUCKINGHAM, a citizen of the United States, residing at Laton, in the county of Fresno, State of California, have invented certain new and useful Improvements in Cultivators, of which the following is a specification, reference being had therein to the accompanying drawings.

This invention relates to a cultivator, and particularly to a structure embodying a truck and movable frame thereon.

The invention has for an object to improve the details of construction of the movable frame carrying the harrow-teeth whereby it may be shifted and retained in its raised and lowered positions.

A further object of the invention is to provide such a truck with a clod-crusher and a vine-stripper carried by the movable harrow-frame adjustably mounted on said truck.

Other objects and advantages of the invention will be hereinafter set forth, and the novel features thereof defined by the appended claims.

In the drawings, Figure 1 is a plan of the cultivator; Fig. 2, a side elevation thereof; Fig. 3, a vertical longitudinal section; Fig. 4, a cross-section on the line 4 4 of Fig. 3; Fig. 5, a detail vertical section through one of the bearings for the links carrying the pivoted frame, and Fig. 6 a detail perspective of one of the hangers for the vine-cutter.

Like letters of reference refer to like parts in the several figures of the drawings.

The letter A designates the truck of the cultivator, which may be of any desired shape and construction and is provided with carrier-wheels $A'$, mounted thereon in any desired manner. These wheels are herein shown as secured to the axles $A^2$, which axles have rotatable bearings within the side bars $A^3$ of the frame. These bars are connected together by any desired number of cross-bars $A^4$ intermediate of the ends of the side bars. The side bars are also provided with recessed portions $A^5$, adapted to receive the side bars of the harrow-frame B, which is pivotally mounted upon the side bars of the truck by means of links $B'$ at its opposite ends. These links are disposed in an inclined plane when the harrow-frame is in its lowered position, as shown in Fig. 2. The links may be pivotally mounted in any desired manner; but a very desirable construction thereof is shown in Fig. 5, where a bearing-sleeve $B^2$ is disposed within the side bars upon which the links are mounted, and said links are disposed at opposite sides of each of said bars and separated therefrom by washers $B^3$, if desired. A pivoting-bolt $B^4$ extends through the links and side bars, as shown.

At the opposite ends of the side bars of the truck clod-crushers C are provided and comprise an inclined end board having upon the rear face thereof a block $C'$, provided with a series of apertures $C^2$, by which the board may be adjusted or held entirely out of operative position. The side bars are also provided upon their inner surfaces with a cleat $C^3$ at the rear of the crushers, against which the ends of the crusher-boards bear, while these parts are adjustably held by means of a bolt $C^4$ extending through the side bars of the frame and the block upon the rear of the crushers.

Extending between the front and rear cross-bars $A^4$ is a yoke $A^6$, provided with a series of apertures $A^7$, through which a holding-pin $A^8$ is adapted to pass. Coöperating with this yoke is a lever $B^5$, secured to the harrow-frame B and provided with a series of apertures $B^6$, which in the oscillatory movement of the harrow-frame come into alinement with the apertures $A^7$, and the parts are secured together by means of the holding-pin $A^8$, thus providing means for adjusting the teeth of the harrow and for retaining them entirely above the ground-level, as shown in Fig. 3. The seat $A^9$ may be suitably disposed upon the truck and bracing-bars used in any desired position, as may be found necessary.

Any preferred form of harrow-tooth may be mounted upon the frame B, and a very desirable construction thereof is the vibrating tooth herein shown, which is provided with the shank $D'$, mounted within the boxing $D^2$ and held against downward movement therein by means of a pin D³. The teeth D are thus free for pivotal movement in their contact with the ground. Supported from the harrow-frame B is a vine and weed cutter E, which is preferably of V-shaped construction, as shown in Fig. 1, and which is supported by hangers E', which are pivotally mounted in boxes E² at their upper ends and at E³ are similarly mounted in the cutter-blades E and there provided with stop-lugs E⁵. The advancing face of these hangers is sharpened, as at E⁴, so as to cut any vines or weeds which may contact therewith, and thus prevent any clogging which would interfere with the operation of the cultivator.

In the operation of the invention it will be seen that the harrow-frame may be shifted from the position shown in Fig. 2 to that shown in Fig. 3 and secured in either of these positions or intermediate thereof by means of the lever and the bolt-pin extending through the yoke carried by the truck, while if this pin be omitted the advantages of a floating harrow are secured. By providing the recessed truck-frame to receive the harrow-frame the strain of longitudinal movement in the operation of the cultivator is applied directly to the truck and removed from the supporting-links, while the particular construction of these links provides for the operation thereof with a minimum of friction, and consequently requires but a small application of power. The use of the clod-crushers at the opposite ends of the truck and the connection with the vine-cutters and harrows causes the device to complete the cultivating action and leaves the ground in a level condition to greatly assist in retaining the moisture in a dry climate where irrigation is necessary. The forward crusher also carries down all weeds or vegetation, so that the cutter can engage the same to the best advantage and will not be clogged up thereby.

In the structure by which the axles have their bearings in the truck-frame and not in the wheels the latter are prevented from wearing out, as it is impossible to use a small wheel in soft ground without a great deal of grit and dust working into the bearings thereof.

It will be obvious that changes may be made in the details of construction and operation of the invention without departing from the spirit thereof as defined in the appended claims.

Having described my invention and set forth its merits, what I claim, and desire to secure by Letters Patent, is—

1. In a cultivator, a truck-frame provided with recessed side bars, a harrow-frame adapted to seat in said recess, and links connecting the harrow-frame and truck-bars.

2. In a cultivator, a truck-frame provided with recessed side bars, a harrow-frame adapted to seat in said recess, links connecting the harrow-frame and truck-bars, a yoke supporting the truck, a lever carried by the harrow-frame, and means for connecting said yoke and lever.

3. In a cultivator, a truck-frame provided with recessed side bars, a harrow-frame adapted to seat in said recess, links connecting the harrow-frame and truck-bars, a yoke supporting the truck, a lever carried by the harrow-frame, means for connecting said yoke and lever, clod-crushers at the opposite ends of said truck, and a vine-cutter supported by the harrow-frame.

4. In a cultivator, a truck-frame provided with recessed side bars, a harrow-frame adapted to seat in said recess, links connecting the harrow-frame and truck-bars, a yoke supporting the truck, a lever carried by the harrow-frame, means for connecting said yoke and lever, clod-crushers at the opposite ends of said truck, a vine-cutter supported by the harrow-frame, and carrier-wheels for said truck having axles secured thereto and rotatably mounted in the side bars of the truck.

5. In a cultivator, a truck having side bars, a crusher-board extending between the said side bars at one end of the truck, a cleat upon said side bars at the rear of the crusher-board, a block carried by said board, and a securing-bolt extending through the side bars and block.

6. In a cultivator, a truck, having relatively fixed traction-wheels, a harrow-frame disposed above the truck to rest thereon when in its lowered position, inclined links for connecting said truck and frame, and means engaging a fixed support from the truck for raising and lowering the harrow-frame relative to the truck.

7. In a cultivator, a truck, a harrow-frame carried thereby, a cutter-blade beneath said frame, hangers for said blade, and pivotal bearings upon the frame and blade for the opposite ends of said hangers.

8. In a cultivator, a truck having carrier-wheels, a harrow-frame, links connecting the opposite ends of said frame with said truck, a yoke extending longitudinally of the truck above said frame, a lever carried by said frame, and means for adjustably securing said lever to said yoke.

9. In a cultivator, a truck having carrier-wheels, a harrow-frame, links connecting the opposite ends of said frame with said truck, a yoke extending longitudinally of the truck above said frame, a lever carried by said frame, means for adjustably securing said lever to said yoke, pivoted harrow-teeth carried by said frame, and a vine-cutter supported beneath said frame.

10. In a cultivator, a truck having carrier-wheels, a harrow-frame, links connecting the opposite ends of said frame with said truck, a yoke extending longitudinally of the truck above said frame, a lever carried by said frame, means for adjustably securing said lever to said yoke, pivoted harrow-teeth carried by said frame, a vine-cutter supported beneath said frame, inclined clod-crushers at the front and rear of said frame, and means for adjusting the positions of said crushers.

In testimony whereof I affix my signature in presence of two witnesses.

JOHN L. BUCKINGHAM.

Witnesses:
H. D. LINDLEY,
Z. L. CORNWELL.